United States Patent
Hidaka et al.

(10) Patent No.: US 9,810,561 B2
(45) Date of Patent: Nov. 7, 2017

(54) FLOW RATE MEASURING APPARATUS

(71) Applicant: Mitsubishi Electric Corporation, Tokyo (JP)

(72) Inventors: Shinichiro Hidaka, Tokyo (JP); Yuji Ariyoshi, Tokyo (JP); Masahiro Kawai, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 110 days.

(21) Appl. No.: 14/870,152

(22) Filed: Sep. 30, 2015

(65) Prior Publication Data

US 2017/0023389 A1    Jan. 26, 2017

(30) Foreign Application Priority Data

May 15, 2015    (JP) .................................. 2015-099743

(51) Int. Cl.
*G01F 5/00*    (2006.01)
*G01F 1/69*    (2006.01)
(Continued)

(52) U.S. Cl.
CPC .............. *G01F 1/69* (2013.01); *F02D 41/187* (2013.01); *F02M 35/10386* (2013.01);
(Continued)

(58) Field of Classification Search
CPC .................................................... F02D 41/187
(Continued)

(56) References Cited

U.S. PATENT DOCUMENTS

| | | | | |
|---|---|---|---|---|
| 4,388,003 A | * | 6/1983 | Feller ..................... | G01K 17/16 374/41 |
| 4,403,871 A | * | 9/1983 | Feller ..................... | G01K 17/16 374/1 |

(Continued)

FOREIGN PATENT DOCUMENTS

| JP | 3609148 | * | 1/2005 | ............. F02D 41/18 |
|---|---|---|---|---|
| JP | 3609148 B2 | | 1/2005 | |

(Continued)

OTHER PUBLICATIONS

Partial Translation of Japanese Office Action, Application No. JP 2015-099743, Jan. 26, 2016, 4 pp.*

(Continued)

*Primary Examiner* — Clayton E LaBalle
*Assistant Examiner* — Kevin Butler
(74) *Attorney, Agent, or Firm* — Sughrue Mion, PLLC; Richard C. Turner

(57)    ABSTRACT

A flow rate measuring apparatus includes: a flow rate detecting device placed in an intake passage; a detection circuit for outputting an analog signal varying depending on the flow rate; a conversion circuit for converting the analog signal to a digital signal; a temperature detecting device for detecting an ambient temperature; and a correction circuit for primarily correcting the digital signal using a gain and/or an offset (correction coefficient) that can set the temperature coefficient in any appropriate way. The gain and/or the offset vary depending on the temperature coefficient set in any appropriate way and the ambient temperature detected by the temperature detecting device. Also, a plurality of the gains and/or the offsets are set depending on the flow rate, allowing the temperature characteristic error in flow rate measurement to be reduced.

4 Claims, 10 Drawing Sheets

(51) Int. Cl.
G01F 1/696 (2006.01)
F02D 41/18 (2006.01)
F02M 35/10 (2006.01)
G01F 1/684 (2006.01)
G01F 1/698 (2006.01)
F02D 41/28 (2006.01)

(52) U.S. Cl.
CPC ...... G01F 1/6965 (2013.01); F02D 2041/281 (2013.01); F02D 2200/0414 (2013.01); G01F 1/684 (2013.01); G01F 1/6842 (2013.01); G01F 1/698 (2013.01); G01F 5/00 (2013.01)

(58) Field of Classification Search
USPC ........................................................ 73/114.34
See application file for complete search history.

(56) References Cited

U.S. PATENT DOCUMENTS

| | | | | |
|---|---|---|---|---|
| 5,435,180 A * | 7/1995 | Uchiyama | ............. | F02D 41/187 73/204.18 |
| 5,654,506 A * | 8/1997 | Yoneda | ................ | G01F 1/6842 73/114.34 |
| 5,753,815 A * | 5/1998 | Murata | ..................... | G01P 5/12 73/204.15 |
| 5,789,673 A * | 8/1998 | Igarashi | .................... | G01F 5/00 73/114.34 |
| 5,824,895 A * | 10/1998 | Itsuji | ..................... | F02D 41/187 73/204.11 |
| 5,892,146 A * | 4/1999 | Kobayashi | ................ | G01F 5/00 73/114.34 |
| 5,939,628 A * | 8/1999 | Igarashi | .................. | G01F 1/684 73/202 |
| 6,101,869 A * | 8/2000 | Kadohiro | ............. | F02M 35/021 73/114.32 |
| 6,182,639 B1 * | 2/2001 | Igarashi | ................ | F02D 41/187 123/494 |
| 6,321,165 B1 * | 11/2001 | Ohta | ..................... | F02D 41/187 702/183 |
| 6,327,905 B1 * | 12/2001 | Itsuji | ..................... | G01F 1/696 73/204.15 |
| 6,357,293 B1 * | 3/2002 | Ando | ....................... | G01F 1/698 73/204.17 |
| 6,427,668 B1 * | 8/2002 | Igarashi | ................ | F02D 41/187 123/494 |
| 6,516,785 B1 * | 2/2003 | Nakada | ................... | G01F 1/684 123/494 |
| 6,779,393 B1 * | 8/2004 | Muller | ................... | G01F 1/6842 73/114.34 |
| 9,587,970 B2 * | 3/2017 | Morino | ................. | G01F 1/6842 |
| 2002/0023487 A1 * | 2/2002 | Yasukawa | ............. | F02D 41/187 73/204.26 |
| 2002/0056318 A1 * | 5/2002 | Kobayashi | ................ | G01F 1/69 73/204.17 |
| 2003/0019289 A1 * | 1/2003 | Ueyama | .................. | G01F 1/688 73/204.22 |
| 2003/0070494 A1 * | 4/2003 | Kanke | .................... | F02D 9/1035 73/861.19 |
| 2004/0244478 A1 * | 12/2004 | Kanke | .................... | G01F 1/6845 73/204.15 |
| 2005/0268711 A1 * | 12/2005 | Akamatsu | ............... | G01F 1/698 73/204.15 |
| 2007/0220968 A1 * | 9/2007 | Tokuyasu | ............... | G01F 1/6842 73/204.26 |
| 2008/0295575 A1 * | 12/2008 | Tokuyasu | ................ | G01F 1/688 73/23.31 |
| 2009/0126477 A1 * | 5/2009 | Saito | ..................... | G01F 1/6845 73/204.25 |
| 2010/0077851 A1 * | 4/2010 | Minamitani | .......... | G01F 1/6845 73/204.26 |
| 2011/0072897 A1 * | 3/2011 | Minamitani | .......... | G01F 1/6845 73/204.26 |
| 2011/0083514 A1 * | 4/2011 | Naier | ...................... | G01F 1/115 73/861.11 |
| 2012/0079889 A1 * | 4/2012 | Kohno | ................... | F02D 41/0002 73/861 |
| 2012/0103084 A1 * | 5/2012 | Ooga | .................... | G01F 1/6842 73/204.25 |
| 2013/0055799 A1 * | 3/2013 | Tsujii | .................... | G01F 1/6842 73/114.32 |
| 2013/0105137 A1 * | 5/2013 | Kohno | .................. | G01F 1/6845 165/287 |
| 2014/0224004 A1 * | 8/2014 | Ariyoshi | .................. | G01F 1/69 73/114.34 |
| 2014/0352424 A1 * | 12/2014 | Morino | ................. | F02D 41/187 73/204.18 |
| 2016/0178421 A1 * | 6/2016 | Matsumoto | ............... | G01P 5/12 73/204.25 |
| 2017/0023389 A1 * | 1/2017 | Hidaka | ..................... | G01F 1/69 |

FOREIGN PATENT DOCUMENTS

| | | | | |
|---|---|---|---|---|
| JP | 3752962 | * | 3/2006 | ............... G01F 1/68 |
| JP | 3752962 B2 | | 3/2006 | |
| JP | 4089152 B2 | | 5/2008 | |
| JP | 2010-185777 A | | 8/2010 | |

OTHER PUBLICATIONS

Communication dated Jan. 26, 2016, issued by the Japan Patent Office in corresponding Japanese Application No. 2015-099743.

* cited by examiner

FLOW RATE MEASURING APPARATUS

BACKGROUND OF THE INVENTION

1. Field of the Invention

The present invention relates to a flow rate measuring apparatus for measuring, for example, the intake air mass of an internal combustion engine.

2. Description of the Related Art

A flow rate measuring apparatus for measuring the intake air flow rate is widely used in an electronically-controlled fuel injection system for an engine of a car or the like. In an environment in which the ambient temperature of the flow rate measuring apparatus varies, the output error of the flow rate measuring apparatus needs to be reduced even when the ambient temperature varies.

For a conventional flow rate measuring apparatus, a technique has been disclosed that uses as a detection circuit a bridge circuit including a heat generating resistor, a temperature measuring resistor, a fixed resistor and the like to reduce the output error due to variation in ambient temperature (temperature characteristic error) by appropriately selecting the fixed resistor (for example, see Patent Document 1).

[Patent Document 1] Japanese Patent No. 4,089,152

The conventional flow rate measuring apparatus described in the Patent Document 1 cannot accurately correct the temperature characteristic error due to variation in ambient temperature in response to the flow rate and temperature of intake air, with an inadequate reduction in the temperature characteristic error.

SUMMARY OF THE INVENTION

In order to solve the above problem, it is an object of the present invention to provide a flow rate measuring apparatus with a higher accuracy.

The flow rate measuring apparatus in accordance with the invention is a flow rate measuring apparatus that is placed in an intake passage of an internal combustion engine and measures the flow rate of intake air, including: a flow rate detecting device placed in the intake passage; a detection circuit for outputting an analog signal varying depending on the flow rate detected by the flow rate detecting device; a conversion circuit for converting the analog signal to a digital signal; a temperature detecting device for detecting the temperature of intake air; and a correction circuit for performing a primary correction by giving a correction coefficient having a temperature coefficient to a temperature characteristic correction formula that is a linear function of the digital signal, wherein the correction coefficient varies depending on the temperature coefficient that is set in any appropriate way and the temperature detected by the temperature detecting device, and wherein a plurality of the correction coefficients are set depending on the flow rate of intake air.

According to the flow rate measuring apparatus of the invention, the correction circuit is provided separate from the detection circuit. Then, in the flow rate measuring apparatus according to the invention, the temperature characteristic is optimally adjusted by the detection circuit, then the remaining temperature characteristic error is corrected by the correction circuit. The correction circuit of the flow rate measuring apparatus of the invention uses a plurality of correction coefficients set depending on the flow rate of intake air to correct the temperature characteristic error, allowing the temperature characteristic error to be reduced.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIGS. 7A and 7B show the relation between the temperature characteristic error of the digital signal Dm from the conversion circuit and the temperature in the first embodiment of the invention, in which FIG. 7A shows the case of Qm=Q1, Q4 while FIG. 7B shows the case of Qm=Q2, Q3;

FIGS. 8A and 8B show the relation between the temperature coefficient of the digital signal Dm from the conversion circuit and the temperature in the first embodiment of the invention, in which FIG. 8A shows the case of Qm=Q1, Q4 while FIG. 8B shows the case of Qm=Q2, Q3;

FIGS. 9A and 9B show the relation between the temperature coefficient of the gain of the correction circuit and the temperature in the first embodiment of the invention, in which FIG. 9A shows the case of Qm=Q1, Q4 while FIG. 9B shows the case of Qm=Q2, Q3;

FIGS. 16A and 16B show the relation between the temperature characteristic error of the digital signal Dm from the conversion circuit and the temperature in the second embodiment of the invention, in which FIG. 16A shows the case of Qm=Q1, Q4 while FIG. 16B shows the case of Qm=Q2, Q3;

FIGS. 17A and 17B show the relation between the temperature coefficient of the digital signal Dm from the conversion circuit and the temperature in the second embodiment of the invention, in which FIG. 17A shows the case of Qm=Q1, Q4 while FIG. 17B shows the case of Qm=Q2, Q3;

FIGS. 18A and 18B show the relation between the temperature coefficient of the gain of the correction circuit and the temperature in the second embodiment of the invention, in which FIG. 18A shows the case of Qm=Q1, Q4 while FIG. 18B shows the case of Qm=Q2, Q3;

FIGS. 19A and 19B show the relation between the temperature coefficient of the digital output Dout of the correction circuit and the temperature in the second embodiment of the invention, in which FIG. 19A shows the case of Qm=Q1, Q4 while FIG. 19B shows the case of Qm=Q2, Q3;

FIGS. 20A and 20B show the relation between the temperature characteristic error of the digital output Dout of the correction circuit and the temperature in the second embodiment of the invention, in which FIG. 20A shows the case of Qm=Q1, Q4 while FIG. 20B shows the case of Qm=Q2, Q3;

DETAILED DESCRIPTION OF THE PREFERRED EMBODIMENTS

First Embodiment

Figure 1:
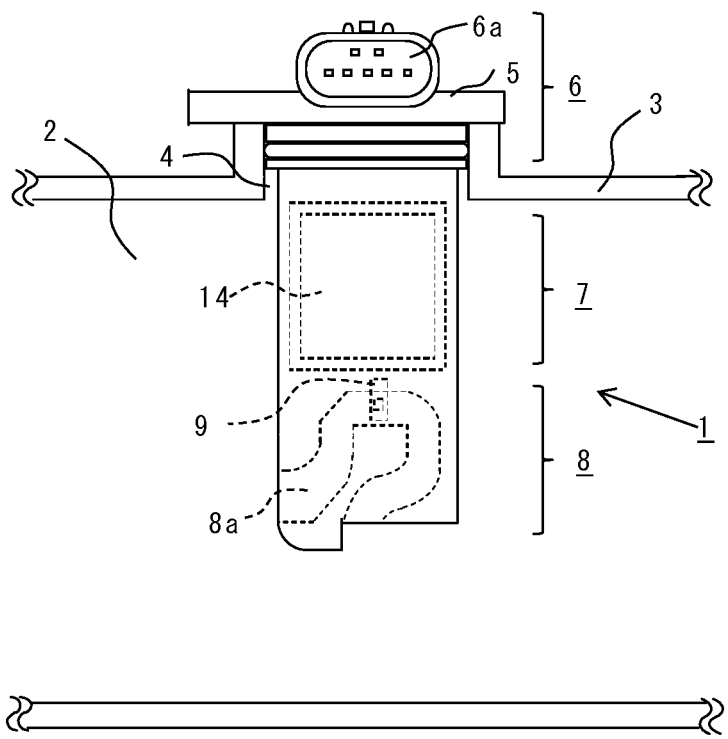
FIG. 1 is a plan view of a flow rate measuring apparatus of a first embodiment of the invention.

Embodiments of the invention are described below with reference to the drawings. Note that, through the drawings, the same or corresponding components are denoted by the same reference numerals. A flow rate measuring apparatus of a first embodiment of the invention is described with reference to FIGS. 1 to 11.

FIG. 1 is a front view of a flow rate measuring apparatus 1 of the first embodiment. The flow rate measuring apparatus 1 is placed inserted into an insertion opening 4 provided in a main passage structuring member 3 structuring a main passage 2 (corresponding to an intake passage) and is fixed to the main passage structuring member 3 by a flange section 5 structuring a connector section 6. The flow rate measuring apparatus 1 includes the connector section 6, a circuit container 7 and a flow passage section 8 in the insertion direction into the main passage structuring member 3. A flow passage 8a into which intake air is taken is provided in the flow passage section 8, and a flow rate detecting device 9 is placed in the flow passage 8a. The flow rate detecting device 9 is part of a detection circuit 10 described later. The circuit container 7 of the flow rate measuring apparatus 1 contains a circuit board 14. The circuit board 14 has a circuit section described later mounted thereon. A drive power supply of the circuit and the output of the circuit are connected to the outside via a connector 6a included in the connector section 6.

Figure 2:
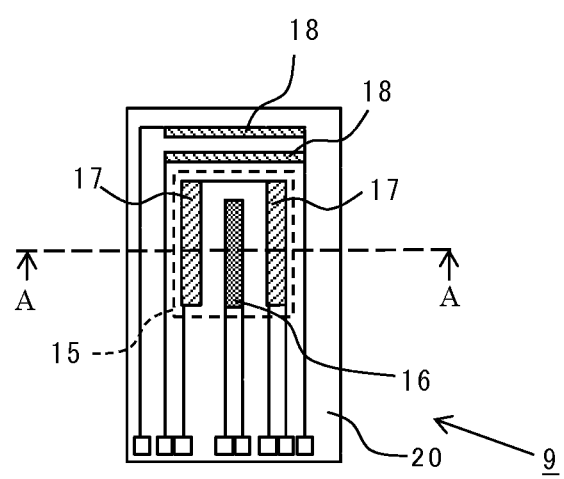
FIG. 2 is a plan view of a flow rate detecting device of the first embodiment of the invention.

FIG. 2 is a plan view of the flow rate detecting device 9 of the first embodiment. As shown in FIG. 2, a detector section 15 is formed on the surface of the flow rate detecting device 9 and exposed to intake air. The detector section 15 has a heat generating resistor 16, which is a heat-sensitive resistor, and a heat generating resistor temperature detecting resistor 17 placed adjacent to each other therein. Additionally, an intake air temperature detecting resistor 18, which is a heat-sensitive resistor, is formed on the portion of the surface of the flow rate detecting device 9 where the detector section 15 is not formed.

Figure 3:
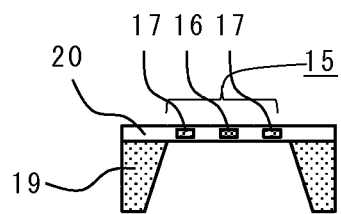
FIG. 3 is a A-A cross-sectional view of FIG. 2.

FIG. 3 is a A-A cross-sectional view of FIG. 2. As shown in FIG. 3, the flow rate detecting device 9 includes a silicon substrate 19 with an insulating film 20 formed on the surface thereof. The heat generating resistor 16 and the heat generating resistor temperature detecting resistor 17 are placed within the insulating film 20. A portion of the silicon substrate 19 on the back side of the detector section 15 has been removed using a technique, such as etching, resulting in a thin film structure of the detector section 15.

Figure 4:
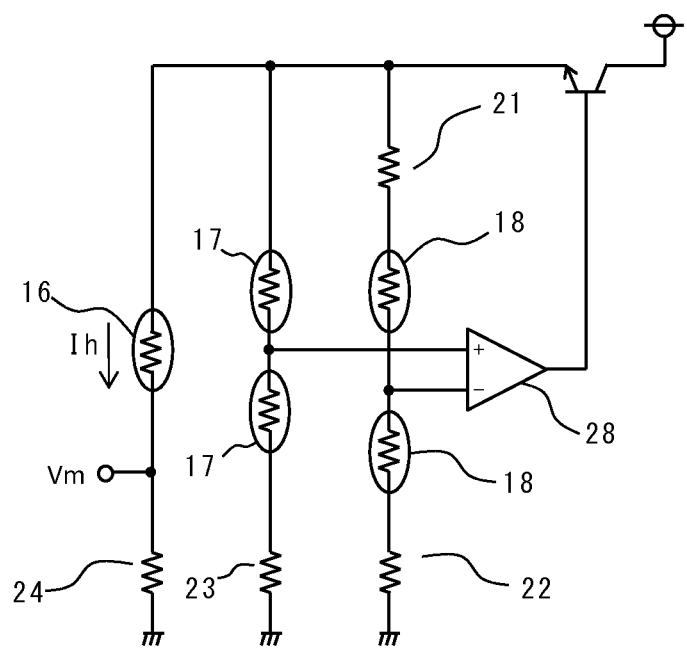
FIG. 4 shows the configuration of a detection circuit of the first embodiment of the invention.

FIG. 4 shows the configuration of a detection circuit 10 (described later) mounted on the circuit board 14 of the first embodiment. As shown in FIG. 4, a bridge circuit is configured using the heat generating resistor 16, the heat generating resistor temperature detecting resistor 17, the intake air temperature detecting resistor 18, and fixed resistors 21, 22, 23, 24. In the detection circuit 10, the mid-point potentials of the bridge circuit are input to an operational amplifier (or op amp) 28, then a voltage according to the difference between the mid-point potentials is output from the op amp 28 and fed back to the top of the bridge circuit. A heating current Ih flows in the heat generating resistor 16 to cause a Joule heat therefrom. Since the heat generating resistor 16 and the heat generating resistor temperature detecting resistor 17 are placed adjacent to each other as shown in FIGS. 2 and 3, the temperature of the heat generating resistor temperature detecting resistor 17 becomes equal to the temperature of the heat generating resistor 16. The bridge circuit is configured to keep the temperature of the heat generating resistor temperature detecting resistor 17 predetermined degrees higher than the temperature of the intake air temperature detecting resistor 18. Since the heat transfer amount from the heat generating resistor 16 to air increases as the flow rate of air flowing above the detector section 15 increases, in order to keep the temperatures of the heat generating resistor 16 and the heat generating resistor temperature detecting resistor 17 predetermined degrees higher than the temperature of the intake air temperature detecting resistor 18, the heating current Ih depending on the flow rate Qm is required. Therefore, by measuring the heating current Ih as an analog signal Vm corresponding to the voltage across the fixed resistor 24, the air flow rate can be detected.

Figure 5:
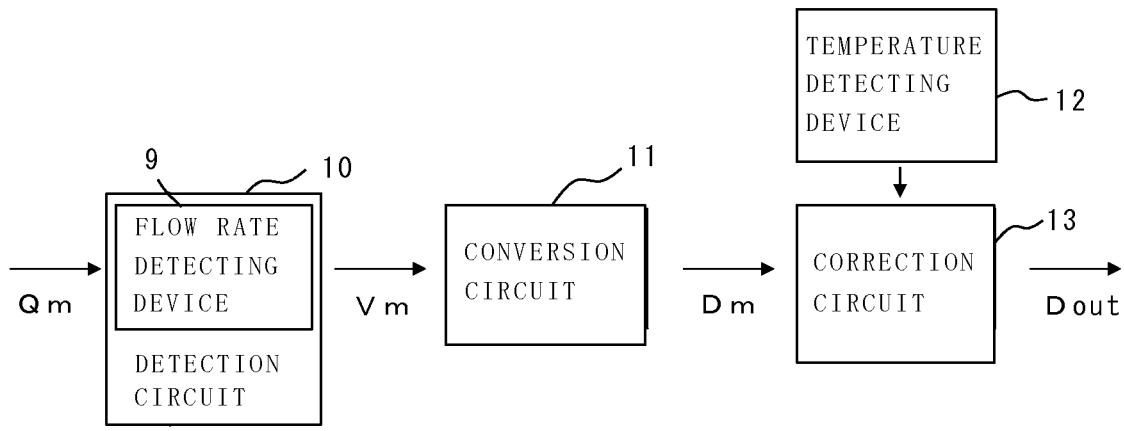
FIG. 5 is a block diagram showing the configuration of the circuit section of the first embodiment of the invention.

FIG. 5 is a block diagram showing the configuration of the circuit section mounted on the circuit board 14 of the first embodiment. As described above, the circuit section is mounted on the circuit board 14 contained in the circuit container 7. The circuit section includes the detection circuit 10, a conversion circuit 11 and a correction circuit 13. The circuit board 14 further includes a temperature detecting device 12 for detecting ambient temperature mounted thereon.

The detection circuit 10 is a circuit that converts the flow rate Qm into the analog signal Vm. The components of the detection circuit 10 other than the flow rate detecting device 9 are mounted on the circuit board 14. The conversion circuit 11 converts the analog signal Vm output from the detection circuit 10 into a digital signal Dm. The correction circuit 13 primarily corrects the digital signal Dm from the conversion circuit 11 using a gain G (one of correction coefficients) that can set a temperature coefficient in any appropriate way and converts the corrected signal into a digital output Dout.

$$Dout = G \times Dm \qquad \text{Eq. 1}$$

Here, the gain G, which is a correction coefficient, varies depending on the temperature coefficient set in any appropriate way and the ambient temperature detected by the temperature detecting device 12. Also, a plurality of the gains may be set depending on the flow rate.

Figure 6:
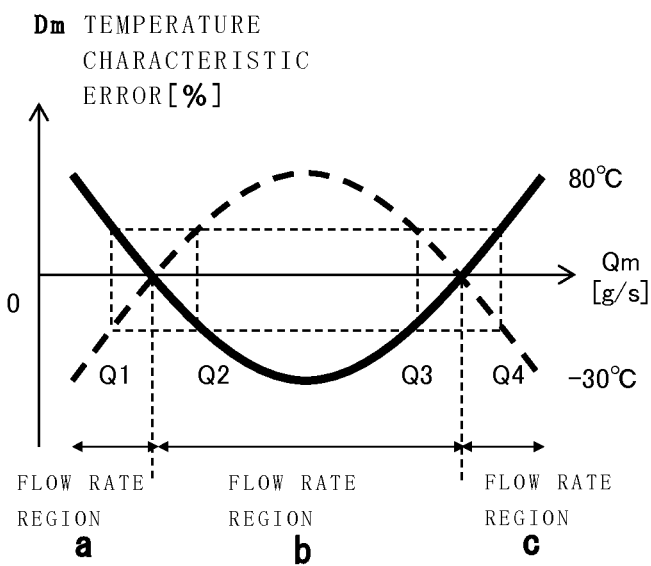
FIG. 6 shows the relation between the temperature characteristic error of the digital signal Dm from the conversion circuit and the flow rate in the first embodiment of the invention.

FIG. 6 shows the relation between the temperature characteristic error of the digital signal Dm output from the conversion circuit 11 and the flow rate Qm in the first embodiment. The temperature characteristic error shows the rate of change in the output at an ambient temperature of 80° C. (as an example of in-car environment, 25° C.+55° C.) and −30° C. (temperature symmetrical to 80° C. with respect to the normal temperature) with respect to an ambient temperature of 25° C. as the normal temperature. FIG. 6 shows the case in which the temperature characteristic errors of the digital signal Dm at an ambient temperature of −30° C. (shown by waveform in broken line) and 80° C. (shown by waveform in solid line) are symmetrical. This is the data corrected by the detection circuit 10 in which, with the detection circuit 10 configured as shown in FIG. 4, the temperature characteristic error of the digital signal Dm is adjusted to be minimum through the selection of the fixed resistors 21, 22.

That is, in FIG. 6, the waveform in solid line showing the case at an ambient temperature of 80° C. is in the same shape as the waveform in broken line showing the case at an ambient temperature of −30° C. with a polarity opposite to each other. The two waveforms cross each other at two points in FIG. 6 (Q=P2, P5) at which the Dm temperature characteristic error is 0%.

Figure 7A:
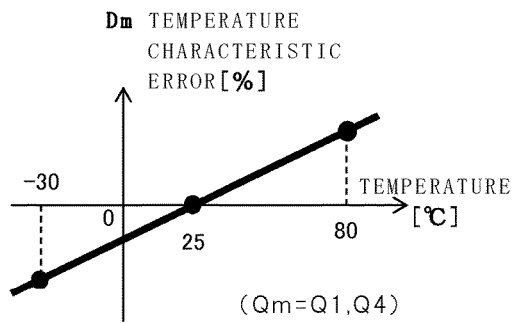
Figure 7B:
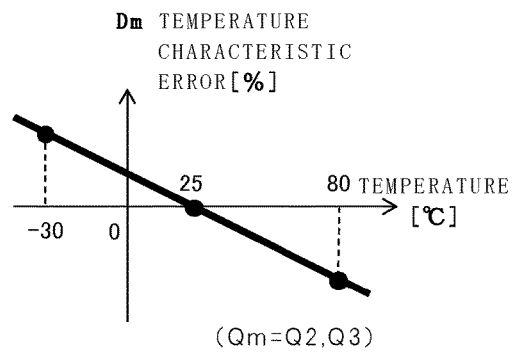
Figure 8A:
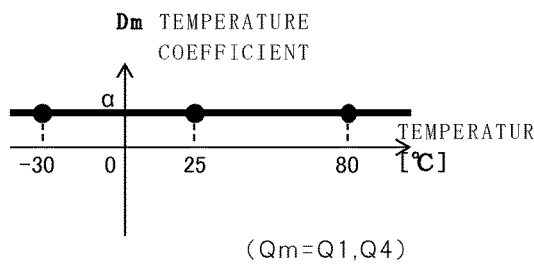
Figure 8B:
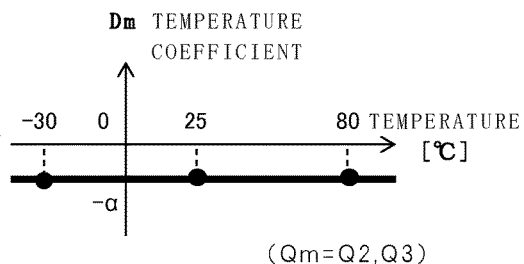

The relation between the temperature characteristic error of the digital signal Dm and the temperature (ambient temperature) at a flow rate of Q1, Q4 in FIG. 6 is shown in FIG. 7A, while the relation between the temperature characteristic error of the digital signal Dm and the temperature at a flow rate of Q2, Q3 is shown in FIG. 7B. With respect to an ambient temperature of 25° C., the temperature characteristic errors of the digital signal Dm at an ambient temperature of 80° C. and −30° C. are symmetrical, and the temperature characteristic error of the digital signal Dm has a constant gradient versus the temperature. That is, as seen from the temperature dependency of the temperature characteristic error of the digital signal Dm shown in FIG. 8A, the digital signal Dm has a temperature coefficient of a at a flow rate of Q1, Q4, while, as shown in FIG. 8B, the digital signal Dm has a temperature coefficient of −α at a flow rate of Q2, Q3.

In the first embodiment, the digital signal Dm from the conversion circuit 11 is provided with the gain G and converted to the digital output Dout by the correction circuit 13. Here, the flow rate region shown in FIG. 6 is divided into three regions, that is, a flow rate region a including the flow rate Q1, a flow rate region b including the flow rate Q2, Q3, and a flow rate region c including the flow rate Q4. For the flow rate regions a, b, c, gains Ga, Gb, Gc are set, respectively. Furthermore, with the digital signal Dm from the conversion circuit 11 at a flow rate of Q1, Q2, Q3, Q4 referred to as Dm1, Dm2, Dm3, Dm4, respectively, and the digital output Dout from the correction circuit 13 at a flow rate of Q1, Q2, Q3, Q4 referred to as Dout1, Dout2, Dout3, Dout4, respectively, the relation between the Dout and the Dm is given by the following formulas (temperature characteristic correction formulas) in which the Dout is a linear function of the Dm.

$$Dout1 = Ga \times Dm1 \quad \text{Eq. 2}$$

$$Dout2 = Gb \times Dm2 \quad \text{Eq. 3}$$

$$Dout3 = Gb \times Dm3 \quad \text{Eq. 4}$$

$$Dout4 = Gc \times Dm4 \quad \text{Eq. 5}$$

Figure 9A:
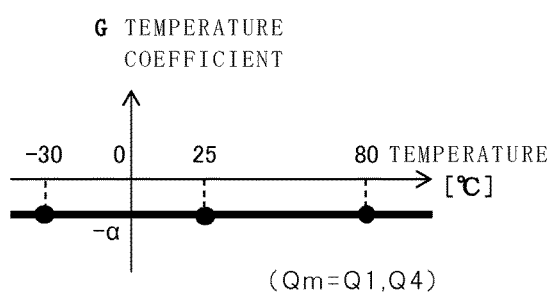

As seen from the temperature dependency of the temperature coefficient of the gain G shown in FIG. 9A, with the temperature coefficient of the gain Ga, Gc set to −α, the gain Ga, Gc varies depending on the ambient temperature detected by the temperature detecting device 12. At this point, the temperature coefficient of the Dout1 is caused to be zero by the temperature coefficient of the Ga cancelling the temperature coefficient of the Dm1. Similarly, the temperature coefficient of the Dout4 is caused to be zero by the temperature coefficient of the Gc cancelling the temperature coefficient of the Dm4. Therefore, as seen from the temperature dependency of the temperature coefficient of the digital output Dout shown in FIG. 10, the temperature characteristic error of the Dout1, Dout 4 is caused to be zero.

Figure 9B:
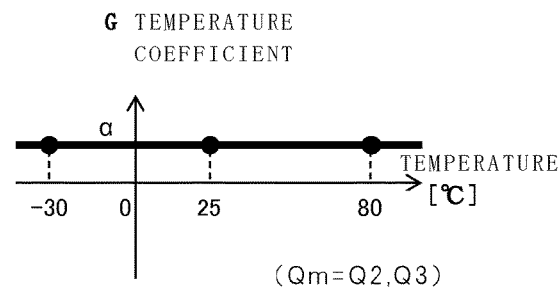
Figure 10:
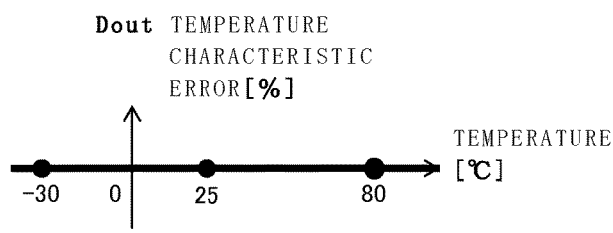
FIG. 10 shows the relation between the temperature coefficient of the digital output Dout of the correction circuit and the temperature in the first embodiment of the invention.

Similarly, with the temperature coefficient of the gain Gb set to α as shown in FIG. 9B, the temperature characteristic error of the Dout2, Dout 3 is caused to be zero as shown in FIG. 10.

Figure 11:
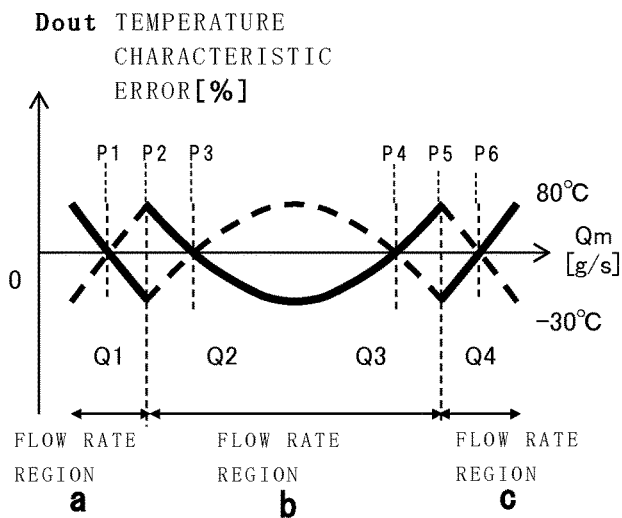
FIG. 11 shows the relation between the temperature characteristic error of the digital output Dout of the correction circuit and the flow rate in the first embodiment of the invention.

Next, FIG. 11 shows the relation between the temperature characteristic error of the digital output Dout from the correction circuit 13 and the flow rate Qm. In FIG. 6, before correction, the Dm temperature characteristic errors at an ambient temperature of −30° C. and 80° C. cross each other at the two points P2, P5. However, through the above correction, as shown in FIG. 11, the two waveforms are shifted so that the error is reduced in each flow rare region such that the waveforms cross each other at the four points, or at the points P1, P3 before and after P2, and at the points P4, P6 before and after P5, thereby achieving reduction in the amount of change in the temperature characteristic error of the waveforms through the flow rate regions.

Thus, the digital signal Dm from the conversion circuit 11 is corrected by the correction circuit 13, allowing the temperature characteristic error to be reduced with respect to the case in FIG. 6.

As described above, according to the first embodiment, the digital signal Dm from the conversion circuit 11 is primarily corrected using a gain having a temperature coefficient by the correction circuit 13, which allows the temperature characteristic error of the digital output Dout from the correction circuit 13 to be reduced. The temperature characteristic correction formula is a linear function of the digital signal Dm from the conversion circuit 11, which can be easily calculated.

Needless to say, the flow rate measuring apparatus 1 configured as described in the first embodiment allows the temperature characteristic error to be reduced with respect to a flow rate measuring apparatus without the correction circuit 13 and allows the flow rate to be more accurately measured.

In the above-described example, the correction circuit 13 divides the flow rate region into three regions, a, b, c, and sets the gains Ga, Gb, Gc having different temperature coefficients for the respective divided flow rate regions. However, dividing the flow rate region into more than three regions allows the temperature characteristic error of the digital output Dout from the correction circuit 13 to be further reduced. Furthermore, in the first embodiment, again set with a given temperature coefficient is provided as a correction coefficient by the correction circuit 13. However, a similar correction may also be performed using an offset set with a given temperature coefficient or using both a gain and an offset set with a given temperature coefficient.

When an offset OS is used as the correction coefficient, the temperature characteristic correction formula is given as follows:

$$Dout = Dm + OS \quad \text{Eq. 6.}$$

When both a gain G and an offset OS are used as the correction coefficient, the temperature characteristic correction formula is given as follows:

$$Dout = G \times Dm + OS \quad \text{Eq. 7}$$

Furthermore, in the first embodiment, the temperature characteristic adjustment is performed by the detection circuit 10, and then, the temperature characteristic adjustment is performed by the correction circuit 13. However, the temperature characteristic adjustment may also be performed only by the correction circuit 13 with the temperature characteristic adjustment by the detection circuit 10 omitted. Furthermore, in the first embodiment, the temperature detecting device 12 is mounted on the circuit board 14, which is contained in the circuit container 7. However, the temperature detecting device 12 may also be placed outside the circuit container 7 using, for example, a thermistor.

Second Embodiment

Next, a second embodiment is described. In the first embodiment described above, the pattern is described in which the waveforms of the flow rate dependency of the Dm temperature characteristic error at an ambient temperature of −30° C. and 80° C. are symmetrical with respect to the x-axis (temperature characteristic error=0), as shown in FIG. 6. However, in some cases, unlike the first embodiment, the waveforms of the flow rate dependency of the Dm temperature characteristic error at a temperature predetermined degrees higher (80° C.) or lower (−30° C.) than the ambient temperature as a reference may not be symmetrical. In such a case, the correction in response to the flow rate according to the first embodiment described above followed by the correction in response to the ambient temperature is effective for error reduction.

So, in the second embodiment described below, in order to reduce the error, in addition to the technique of the first embodiment, a plurality of temperature regions are set according to the ambient temperature, then a temperature coefficient of a correction coefficient (e.g., G temperature coefficient) is set for each temperature region, and then the Dm temperature characteristic error is corrected.

Note that the second embodiment is described in relation to an example detection circuit 10 having a configuration different from that of the first embodiment.

Figure 12:
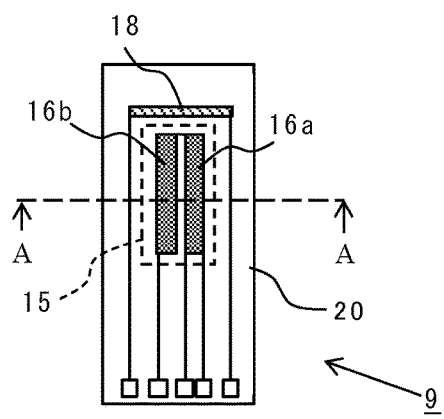
FIG. 12 is a plan view of a flow rate detecting device of a second embodiment of the invention.

FIG. 12 is a plan view of a flow rate detecting device 9 of the second embodiment. As shown in FIG. 12, a detector section 15 is formed on the surface of the flow rate detecting device 9. The detector section 15 has an upstream heat generating resistor 16a and a downstream heat generating resistor 16b, which are a heat-sensitive resistor, placed adjacent to each other therein. Additionally, an intake air temperature detecting resistor 18, which is a heat-sensitive resistor, is formed on the portion of the surface of the flow rate detecting device 9 where the detector section 15 is not formed.

Figure 13:
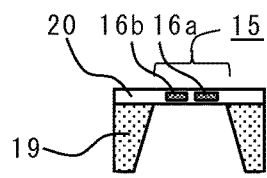
FIG. 13 is a A-A cross-sectional view of FIG. 12.

FIG. 13 is a A-A cross-sectional view of FIG. 12. The flow rate detecting device 9 includes a silicon substrate 19 with an insulating film 20 formed on the surface thereof. The heat generating resistors 16 and a heat generating resistor temperature detecting resistor 17 are formed within the insulating film 20. A portion of the silicon substrate 19 on the back side of the detector section 15 has been removed using a technique, such as etching, resulting in a thin film structure of the detector section 15, as with the first embodiment.

Figure 14:
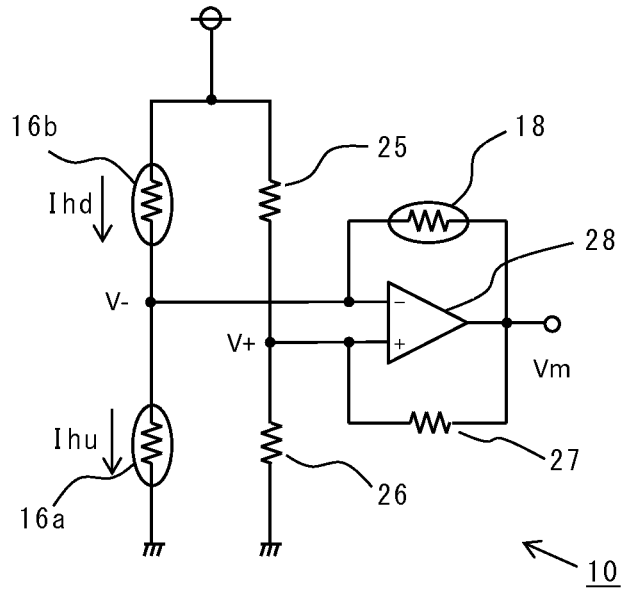
FIG. 14 shows the configuration of a detection circuit of the second embodiment of the invention.

FIG. 14 shows the configuration of the detection circuit 10 of the second embodiment. As shown in FIG. 14, a bridge circuit is configured using the upstream heat generating resistor 16a, the downstream heat generating resistor 16b, the intake air temperature detecting resistor 18, and fixed resistors 25, 26, 27.

In the detection circuit 10, the connection between the downstream heat generating resistor 16b and the fixed resistor 25 is connected to a constant voltage source, while the upstream heat generating resistor 16a and the fixed resistor 26 are grounded. Then, the mid-point potentials of the bridge circuit are input to an op amp 28, and the output of the op amp 28 is fed back to the inverting input terminal of the op amp 28 via the intake air temperature detecting resistor 18 and to the non-inverting input terminal of the op amp 28 via the fixed resistor 27.

Heating currents Ihu, Ihd flow in the upstream heat generating resistor 16a and the downstream heat generating resistor 16b, respectively, to cause a Joule heat therefrom. Since the upstream heat generating resistor 16a is more easily cooled than the downstream heat generating resistor 16b, when air flows above the detector section 15, the potential V− of the connection between the upstream heat generating resistor 16a and the downstream heat generating resistor 16b changes, then the analog signal Vm that is the output of the detection circuit 10 changes so that the V− becomes equal to the potential V+ of the connection between the fixed resistors 25, 26.

Therefore, the air flow rate can be detected by measuring the analog signal Vm.

Figure 15:
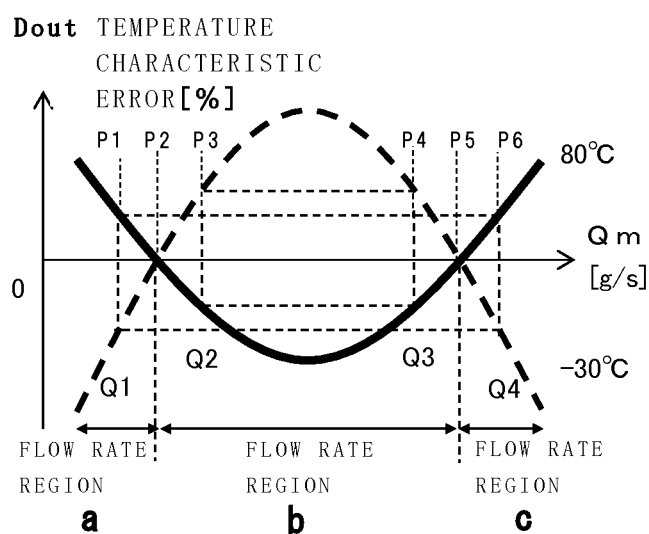
FIG. 15 shows the relation between the temperature characteristic error of the digital signal Dm from the conversion circuit and the flow rate in the second embodiment of the invention.

FIG. 15 shows the relation between the temperature characteristic error of the digital signal Dm output from the conversion circuit 11 and the flow rate Qm. FIG. 15 shows the case in which the temperature characteristic errors of the digital signal Dm from the conversion circuit 11 at an ambient temperature of −30° C. and 80° C. are asymmetrical and the temperature characteristic error at −30° C. is larger. With the detection circuit 10 configured as shown in FIG. 14, the temperature characteristic error of the digital signal Dm can be made minimum through the selection of the fixed resistors 25, 26, 27.

Figure 16A:
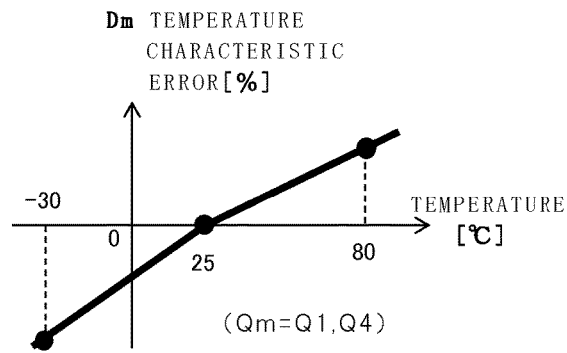
Figure 16B:
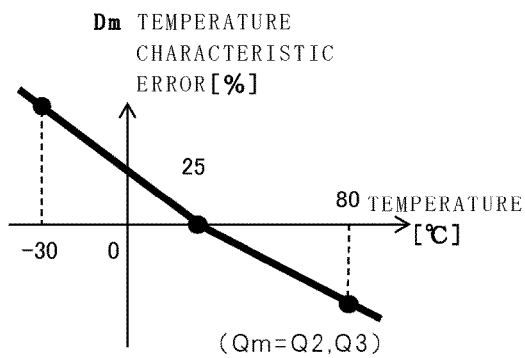
Figure 17A:
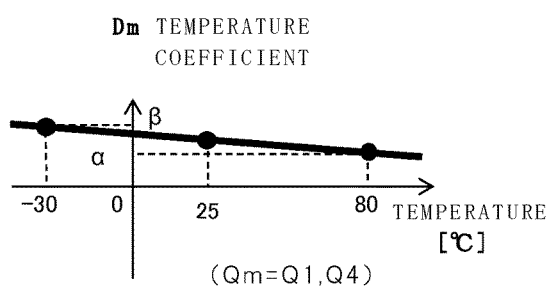
Figure 17B:
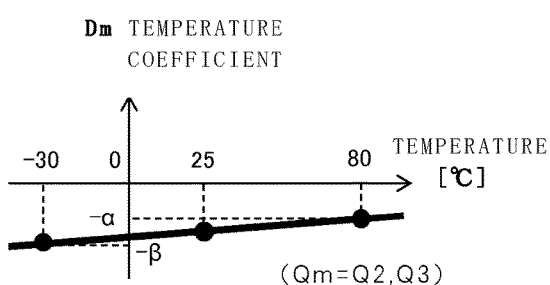

The relation between the temperature characteristic error of the digital signal Dm and the temperature at a flow rate of Q1, Q4 in FIG. 15 is shown in FIG. 16A, while the relation between the temperature characteristic error of the digital signal Dm and the temperature at a flow rate of Q2, Q3 is shown in FIG. 16B. With respect to an ambient temperature of 25° C., the Dm temperature characteristic errors at an ambient temperature of −30° C. and 80° C. are asymmetrical, so the Dm temperature characteristic error does not have a constant gradient versus the temperature. That is, as seen from the temperature dependency of the temperature coefficient of the digital signal Dm shown in FIG. 17A, the Dm temperature coefficient has a negative gradient versus the temperature at a flow rate of Q1, Q4, while, as shown in FIG. 17B, the Dm temperature coefficient has a positive gradient versus the temperature at a flow rate of Q2, Q3.

In the second embodiment, the digital signal Dm from the conversion circuit 11 is provided with the gain G and converted to the digital output Dout by the correction circuit 13. For three flow rate regions shown in FIG. 15, that is, a flow rate region a including the flow rate Q1, a flow rate region b including the flow rate Q2, Q3, and a flow rate region c including the flow rate Q4, gains Ga, Gb, Gc are set, respectively. With the digital signal Dm from the conversion circuit 11 at a flow rate of Q1, Q2, Q3, Q4 referred to as Dm1, Dm2, Dm3, Dm4, respectively, and the digital output Dout from the correction circuit 13 at a flow rate of Q1, Q2, Q3, Q4 referred to as Dout1, Dout2, Dout3, Dout4, respectively, the relation between the Dout and the Dm is given by the following formulas (temperature characteristic correction formulas) in which the Dout is a linear function of the Dm.

$$Dout1 = Ga \times Dm1 \quad \text{Eq. 8}$$

$$Dout2 = Gb \times Dm2 \quad \text{Eq. 9}$$

$$Dout3 = Gb \times Dm3 \quad \text{Eq. 10}$$

$$Dout4 = Gc \times Dm4 \quad \text{Eq. 11}$$

Figure 18A:
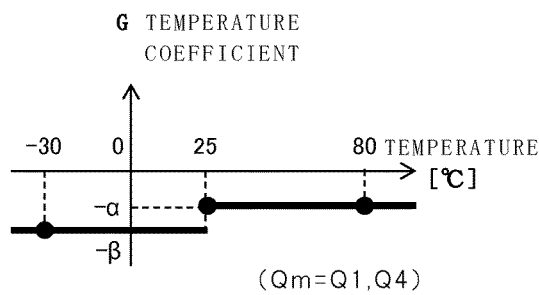
Figure 19A:
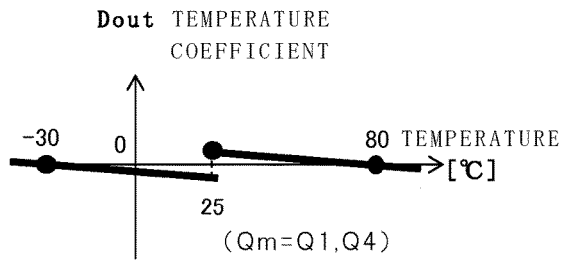
Figure 20A:
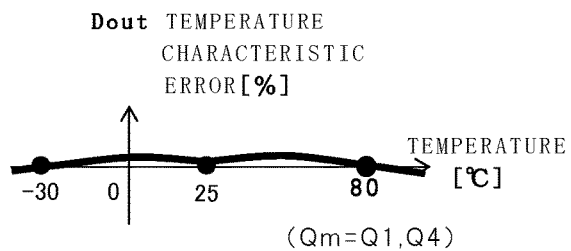

As seen from the ambient temperature dependency of the temperature coefficient of the gain Ga, Gc at a flow rate of Q1, Q4 shown in FIG. 18A, with the temperature coefficient of the gain Ga, Gc set to $-\beta$ at an ambient temperature lower than 25° C. and to $-\alpha$ at an ambient temperature of 25° C. or higher, the gain Ga, Gc varies depending on the ambient temperature detected by the temperature detecting device 12. At this point, the temperature coefficient of the Dout1 is caused to be smaller than the temperature coefficient of the Dm1 by the superposition of the temperature coefficient of the Dm1 and the temperature coefficient of the Ga, as shown in FIG. 19A. Similarly, the temperature coefficient of the Dout4 is caused to be smaller than the temperature coefficient of the Dm4 by the superposition of the temperature coefficient of the Dm4 and the temperature coefficient of the Gc, as shown in FIG. 19A. As a result, the temperature characteristic error of the Dout1, Dout4 versus the temperature is as shown in FIG. 20A, in which the temperature characteristic error from an ambient temperature of $-30°$ C. to 80° C. is significantly reduced with respect to that shown in FIG. 16A, and, at least the number of temperatures at which the error is caused to be 0% increases to three or more, including $-30°$ C., 25° C., 80° C.

Figure 18B:
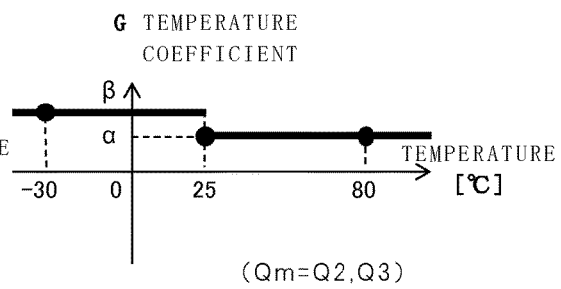
Figure 19B:
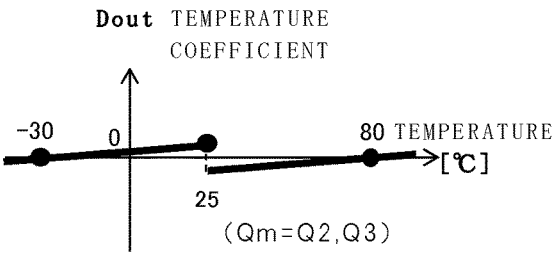
Figure 20B:
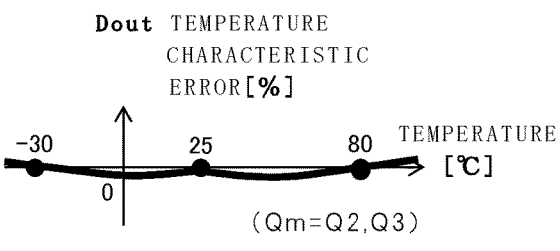

Also, as seen from the ambient temperature dependency of the temperature coefficient of the gain Gb at a flow rate of Q2, Q3 shown in FIG. 18B, with the temperature coefficient of the gain Gb set to $\beta$ at an ambient temperature lower than 25° C. and to $\alpha$ at an ambient temperature of 25° C. or higher, the temperature coefficient of the Dout2, Dout3 is caused to be smaller than the temperature coefficient of the Dm2, Dm3, as shown in FIG. 19B. As a result, the temperature characteristic error of the Dout2, Dout3 versus the temperature is as shown in FIG. 20B.

Figure 21:
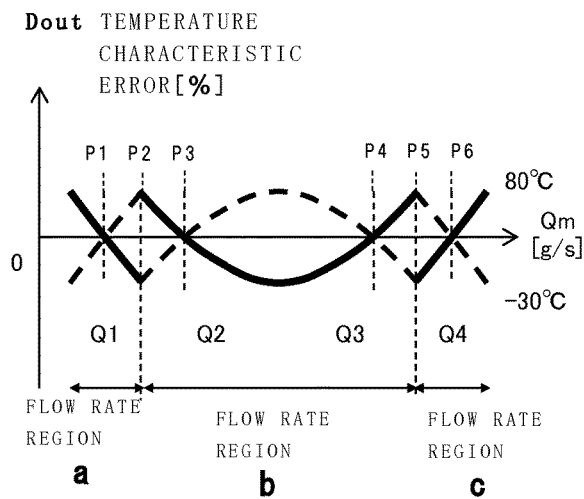
FIG. 21 shows the relation between the temperature characteristic error of the digital output Dout of the correction circuit and the flow rate in the second embodiment of the invention.

FIG. 21 shows the relation between the temperature characteristic error of the digital output Dout from the correction circuit 13 and the flow rate Qm. As shown in FIG. 21, with the G temperature coefficients set for the respective temperature regions, the waveforms indicating the temperature characteristic error at an ambient temperature of $-30°$ C. and 80° C. with respect to an ambient temperature of 25° C. as the normal temperature are symmetrical with respect to the x-axis, allowing reduction in the rate of change of the error depending on the ambient temperature. Thus, the digital signal Dm from the conversion circuit 11 is corrected by the correction circuit 13, allowing the temperature characteristic error to be reduced with respect to the case in FIG. 15.

As described above, according to the second embodiment, a plurality of the G temperature coefficients for the correction by the correction circuit 13 are set depending on the ambient temperature detected by the temperature detecting device 12. Then, the digital signal Dm output from the conversion circuit 11 is primarily corrected using a gain having a plurality of temperature coefficients depending on the temperature, allowing the temperature characteristic error of the digital output Dout from the correction circuit 13 to be reduced. Note that the temperature characteristic correction formula for the correction is a linear function of the digital signal Dm from the conversion circuit 11, which can be easily calculated.

In the second embodiment, the case has been described as an example in which the correction circuit 13 divides the flow rate region into three regions, and sets the gains having different temperature coefficients for the respective divided flow rate regions. However, needless to say, dividing the flow rate region into more than three regions allows the temperature characteristic error of the digital output Dout from the correction circuit 13 to be further reduced. Furthermore, in the second embodiment, a gain set with a given temperature coefficient is provided by the correction circuit 13. However, a similar correction may also be performed using an offset set with a given temperature coefficient or using both a gain and an offset set with a given temperature coefficient. Furthermore, in the second embodiment, the temperature characteristic adjustment is performed by the detection circuit 10, and then, the temperature characteristic adjustment is performed by the correction circuit 13. However, the temperature characteristic adjustment may also be performed only by the correction circuit 13 with the temperature characteristic adjustment by the detection circuit 10 omitted. Furthermore, in the second embodiment, the temperature detecting device 12 is mounted on the circuit board 14, which is contained in the circuit container 7. However, the temperature detecting device 12 may also be placed outside the circuit container 7 using, for example, a thermistor, as with the first embodiment.

Third Embodiment

In a third embodiment, a case is described in which the temperature detecting device 12 described in the first and second embodiments is formed on a flow rate detecting device 9 using a heat-sensitive resistor.

Figure 22:
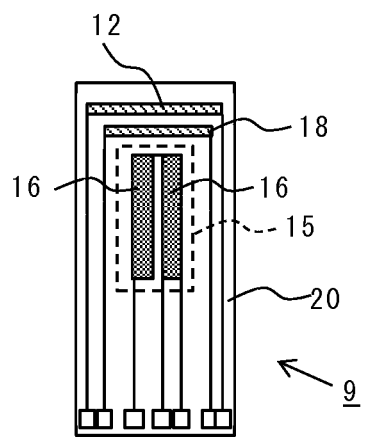
FIG. 22 is a plan view of a flow rate detecting device of a third embodiment of the invention.

FIG. 22 is a plan view of the flow rate detecting device 9 in the third embodiment. A detector section 15 is formed on the surface of the flow rate detecting device 9, and an intake air temperature detecting resistor 18, which is a heat-sensitive resistor, and a temperature detecting device 12 are formed on the portion of the surface of the flow rate detecting device 9 where the detector section 15 is not formed.

According to the third embodiment, the temperature detecting device 12 is formed on the flow rate detecting device 9, so the temperature detecting device 12 can detect almost the same temperature as the flow rate detecting device 9, which can improve the accuracy of temperature characteristic correction with respect to the case in which the temperature detecting device 12 is formed outside the flow rate detecting device 9 (e.g., in the circuit section). Furthermore, the temperature detecting device 12 is formed on the flow rate detecting device 9 without increase in cost, and the need for forming the temperature detecting device 12 in the circuit section is eliminated, which can reduce the cost of the flow rate measuring apparatus 1.

Note that according to the invention, the embodiments may be freely combined or the embodiments may be appropriately modified or omitted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A flow rate measuring apparatus that is placed in an intake passage of an internal combustion engine and measures the flow rate of intake air, comprising:
   a flow rate detecting device placed in the intake passage;
   a detection circuit for outputting an analog signal varying depending on the flow rate detected by the flow rate detecting device;
   a conversion circuit for converting the analog signal to a digital signal;
   a temperature detecting device for detecting the temperature of intake air; and
   a correction circuit for performing a primary correction by giving a correction coefficient having a temperature coefficient to a temperature characteristic correction formula that is a linear function of the digital signal,
   wherein the correction coefficient varies depending on the temperature coefficient that is set in any appropriate way and the temperature detected by the temperature detecting device, and
   wherein a plurality of the correction coefficients are set depending on the flow rate of intake air by dividing a flow rate region of the intake air into a plurality of flow rate regions and separately setting a correction coefficient among the plurality of correction coefficients for each of the plurality of flow rate regions.

2. The flow rate measuring apparatus according to claim 1, wherein a plurality of the temperature coefficients are set depending on the temperature detected by the temperature detecting device.

3. The flow rate measuring apparatus according to claim 1, wherein the correction coefficient is a gain or offset or both.

4. The flow rate measuring apparatus according to claim 1, wherein the temperature detecting device is a heat-sensitive resistor formed on the flow rate detecting device.

* * * * *